Oct. 20, 1925.
W. R. LITTLE
FLOWERPOT
Filed July 19, 1924
1,557,712
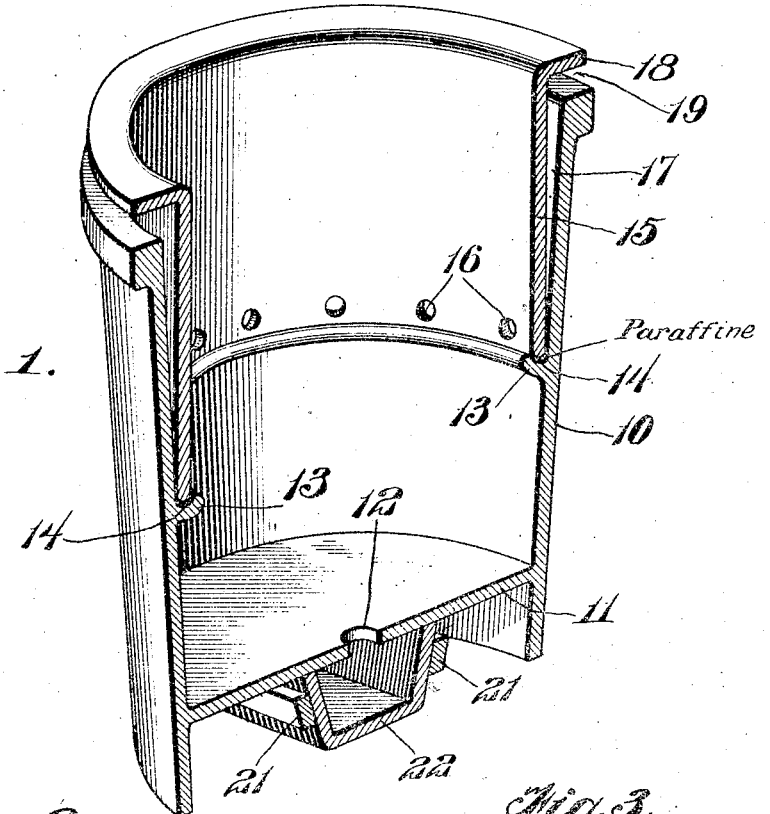
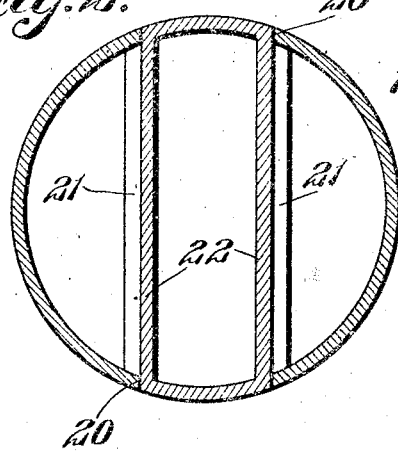
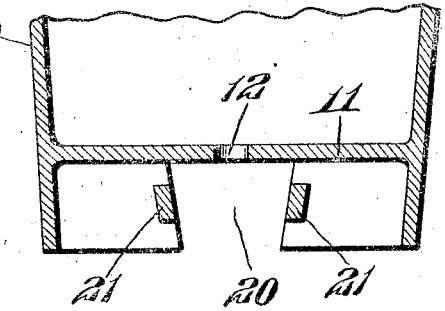
Inventor
Wilber R. Little
By Watson E. Coleman
Attorney Patented Oct. 20, 1925.

1,557,712

UNITED STATES PATENT OFFICE.

WILBER R. LITTLE, OF IOWA FALLS, IOWA.

FLOWERPOT.

Application filed July 19, 1924. Serial No. 727,015.

*To all whom it may concern:*

Be it known that I, WILBER R. LITTLE, a citizen of the United States, residing at Iowa Falls, in the county of Hardin and State of Iowa, have invented certain new and useful Improvements in Flowerpots, of which the following is a specification, reference being had to the accompanying drawings.

This invention relates to flower pots and has for an important object thereof the provision of a flower pot whereby water may be placed in the pot so that it enters the earth in which the plant contained within the pot is placed at a point below the surface of the earth, and accordingly at a point where it is nearer the roots of the plant and more readily absorbed and where it does not muddy the surface of the soil and render the same liable to soil the clothing of persons coming in contact therewith.

A further object of the invention is to provide a device of this character having an outer pot and an inner removable sleeve associated with the outer pot, the sleeve and pot combining to form a water space into which the water may be poured, the sleeve being so constructed that it protects the opening of the space from leaves or the like falling from the plant contained within the pot.

A still further object of the invention is to provide an improved pot and drip bowl structure.

These and other objects I attain by the construction shown in the accompanying drawings, wherein for the purpose of illustration is shown a preferred embodiment of my invention and wherein:—

Figure 1 is a sectional perspective of a flower pot constructed in accordance with my invention;

Figure 2 is a transverse sectional view through the pot taken immediately above the braces 21;

Figure 3 is a vertical sectional view of the lower end of the pot, the drip pan being removed.

Referring now more particularly to the drawings, the numeral 10 indicates a pot structure of any desired shape or size but preferably cylindrical and tapering toward its lower end. The inner wall of the pot is connected with a base 11 which is in spaced relation to the bottom of the wall, this base being provided with a central drain opening 12. Above the bottom of the wall and preferably midway of the pot, as defined by the bottom 11 and side wall, the side wall is flanged, as at 13, the upper wall of the flange being formed to provide a groove 14.

The numeral 15 designates a sleeve preferably cylindrical throughout the major portion of its length and having its lower end of the same diameter as the diameter of the groove 14 formed in the upper surface of the flange 13. This lower end of the sleeve is seated in this groove and sealed therein by means of a waterproof substance such as paraffine, as indicated. Adjacent the bottom of the sleeve, openings 16 are formed therein to permit passage of water from the space 17 between the sleeve and the outer wall of the pot. In order to prevent leaves from falling into this space, the upper end of the sleeve is extended above the upper end of the pot and then flanged outwardly, as at 18, so that its extremity overlies the upper end of the outer wall of the pot in spaced relation thereto, thus leaving an opening 19 through which water may be introduced to the space without disturbing the sleeve.

The lower end of the outer wall of the pot below the bottom has formed therein notches 20 opening through the bottom edge of the outer wall, these notches increasing in width upwardly and the edges of the notches being connected by supports 21 adjacent faces of which are inclined at the same inclination as the walls of the notch. Slidably engaged through these notches is a drip pan 22 having its end walls shaped to conform to the shaping of the outer walls of the pot at the point of formation of the notches therein and having its side walls flaring upwardly at the same angle as the angles of the sides of the notches 20 of the side walls, so that this drip pan may be inserted or removed from the pot at any time but when the pot is lifted will be supported from the sides of the notches and from the supports 21. If desired, one of the opposed notches 20 may be eliminated, making the pan removable from one side only of the flower pot.

It will be obvious that the structure hereinbefore set forth is capable of a certain range of change and modification without materially departing from the spirit of my invention, and I accordingly do not limit myself to such specific structure except as hereinafter claimed.

I claim:—

A flower pot including side walls and a bottom, the bottom being spaced from the lower ends of the side walls, the side walls having a notch formed therein, the bottom having an opening formed therein, a drip pan insertible through the notch beneath the bottom to receive drippings from the opening of the bottom, said drip pan having upwardly flaring sides, and supports extending transversely of the pot having their adjacent faces inclined at an angle equal to the angle of flare of the sides of the drip pan and spaced apart a distance equal to the width of the drip pan at the point of contact with the support.

In testimony whereof I hereunto affix my signature.

WILBER R. LITTLE.